United States Patent Office 3,564,039
Patented Feb. 16, 1971

3,564,039
DIIMINOSUCCINONITRILE AND ITS PREPARATION FROM CYANOGEN AND HYDROGEN CYANIDE
Owen Wright Webster, Wilmington, Del., assignor to E. I. du Pont de Nemours and Company, Wilmington, Del., a corporation of Delaware
No Drawing. Continuation-in-part of application Ser. No. 670,763, Sept. 26, 1967. This application Feb. 23, 1968, Ser. No. 707,459
Int. Cl. C06b 1/00; C07c 121/42
U.S. Cl. 260—465.5          11 Claims

ABSTRACT OF THE DISCLOSURE

Described and claimed are the novel compound diiminosuccinonitrile and its preparation from cyanogen and hydrogen cyanide at a temperature of −80° C. to 10° C., and in the presence of a basic catalyst. The compound is useful as an intermediate in the preparation of diaminomaleonitrile and as a solid propellant.

RELATED APPLICATION

This application is a continuation-in-part of my copending application Ser. No. 670,763, filed Sept. 26, 1967, now abandoned.

FIELD OF THE INVENTION

This invention relates to, and has as its principal objects provision of, the novel compound diiminosuccinonitrile and a process for the preparation of the same by reaction between cyanogen and hydrogen cyanide.

SUMMARY AND DETAILS OF THE INVENTION

In accordance with the present invention, it has been discovered that the novel compound diiminosuccinonitrile can be readily prepared from cyanogen and hydrogen cyanide by the process represented by the equation:

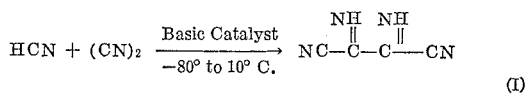

(I)

The product itself can be converted to diaminomaleonitrile (hydrogen cyanide tetramer; see, e.g., U.S. Pat. 2,499,441) according to the further partial equation:

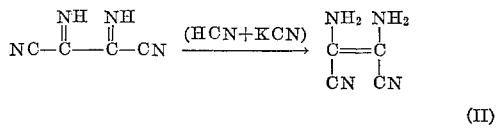

(II)

Compound I is a stable white crystalline solid, M.P. about 166° C. As noted, it can be used as an intermediate to prepare diaminomaleonitrile, Compound II, and actually does not have to be separated from the mixture in which it was prepared for this conversion. The compound is also useful as a solid propellant. Both its precursors, cyanogen and hydrogen cyanide, have a high energy content and thus a high flame temperature. These substances, however, are gaseous and highly toxic, and their use as fuels is limited. Diiminosuccinonitrile, while maintaining the high energy content of the cyanogen and hydrogen cyanide from which it is derived, is a nonvolatile solid and can be safely used in the preparation of solid propellant compositions. For use as a propellant, the substance is intimately mixed with a suitable oxidizing agent, e.g., a nitrate, perchlorate, chlorate, etc., in weight ratios between 1:10 and 10:1 and is then ready for use in a rocket motor in the general manner described in U.S. Pat. 3,338,915. Furthermore, the compound of this invention can be mixed with nitrocellulose or other ballistic compositions as described in U.S. Pat. 2,480,852 to give modified propellant powders.

The process for preparing Compound I is carried out by mixing the precursors, cyanogen and hydrogen cyanide, in the presence of a basic catalyst at a temperature in the range −80° to 10° C., preferably −15° to 0° C. Pressure is not a critical variable, and usually ambient pressure is employed.

The requisite basic catalyst can be either soluble or insoluble. Such inorganic compounds as potassium and sodium cyanides as well as other alkaline cyanides are useful. Also useful are amines, pyridine, powdered soft glass, basic ion-exchange resins, sodium, potassium and other metal hydroxides, calcium, barium and magnesium oxides, basic alumina, sodium carbonate, potassium carbonate, sodium bicarbonate, potassium bicarbonate, etc. The catalysts are those that have utility in the well-known cyanohydrin reaction. They are basic, i.e., exhibit a pH of over 7 in aqueous media. When ion-exchange resins are used in the latter test, the water should contain sodium chloride (or a similar salt).

The process can be carried out neat, i.e., without solvent, or in an organic liquid which is free of Zerewitinoff-active hydrogen and which is inert to cyanogen and hydrogen cyanide. Since cyanogen boils at −21° C. and melts at −28° C. and hydrogen cyanide boils at 26° C. and melts at −14° C., it is preferable, however, to effect the reaction under conditions whereby it is liquid, i.e., by use of selected solvents, pressures, or temperatures whereby the reactants are in a liquid phase. In addition, it is easier to control the reaction rate if a diluent is used. If a solvent or diluent is used, such inert liquids are suitable as acetonitrile, propionitrile, benzonitrile, tetrahydrofuran, dimethylformamide, dimethylacetamide, dimethoxyethane, ether, benzene, toluene, halogenated hydrocarbons such as chlorinated lower (1–2 carbon) aliphatics and the like. Preferred are liquid lower ($C_1$–$C_4$) alkylnitriles, N-di(lower alkyl)amides and chlorinated methane.

For the conversion of diiminosuccinonitrile to diaminomaleonitrile, the same solvents and catalysts as shown above can be used, but a higher reaction temperature, 0°–200° C., and additional hydrogen cyanide are required. The conversion of diaminomaleonitrile, however, does not require an aprotic solvent. Water or alcohols can be used as diluents. On a molar basis, two hydrogen cyanide molecules are required to convert a molecule of diiminosuccinonitrile to diaminomaleonitrile. Generally, however, a 5–100 fold excess of hydrogen cyanide is used for optimum yields. Hydrogen cyanide itself in the presence of basic catalysts gives its tetramer, diaminomaleonitrile (U.S. Pat. 2,499,441). This reaction is, however, very slow compared to the present process using cyanogen.

EMBODIMENTS OF THE INVENTION

There follow some nonlimiting examples which form specific embodiments of the invention. In these examples, and throughout the specification, temperatures are given in degrees centigrade.

EXAMPLE 1

Synthesis of diiminosuccinonitrile

To a suspension of 5.0 g. of potassium cyanide in 100 ml. of acetonitrile cooled to 0° was added 30 ml. of liquid hydrogen cyanide. Gaseous cyanogen (10 g.) was condensed into the system in a period of 1 hour. The reaction mixture was stirred for an additional 2 hours and filtered. The acetonitrile and other volatile material was removed from the filtrate in a rotary evaporation apparatus and the resulting residue stirred with 50 ml. of water. The water-insoluble product, 6.90 g. of diiminosuccinonitrile, was collected on a filter and washed with water. An analytical sample was obtained by recrystallization from benzene, then ethylene chloride, followed by sublimation at 100°/ 0.5 mm. The purified substance is white and melts at 165.5 to 166°.

$\lambda_{max.}^{KBr}$ 3.05$\mu$, 3.75, 4.25, 4.25, 4.43, 5.25, 6.18, 7.13, 7.9, 9.00, and 10.75

NMR (acetone $D_6$) one peak—838 cps. from TMSi.

Analysis.—Calcd. for $C_4H_2N_4$ (percent): C, 45.3; H, 1.9; N, 52.8. M.W. 106. Found (percent): C, 45.6; H, 2.1; N, 52.5. M.W. (B.P. $CH_3CN$) 104.

EXAMPLE 2

A solution of 22.5 g. of hydrogen cyanide, 19.4 g. of cyanogen and 100 ml. of acetonitrile was cooled to −10° and 1.0 g. of dry potassium cyanide was added. After 4 hours at −10° to −5° the reaction mixture was cooled to −40° and filtered. The filter cake was allowed to warm to room temperature and was washed with ice-cold water to remove potassium cyanide. There remained 22.0 g. of white diiminosuccinonitrile.

EXAMPLE 3

A solution of 320 g. of hydrogen cyanide and 294 g. of cyanogen in 1800 ml. of methlylene chloride was cooled to −40° and a solution of 25 ml. of triethylamine in 75 ml. of methylene chloride was added with stirring over a period of 2 hours. After the addition was complete, the white solid which precipitated during the reaction was collected and washed successively with 1 liter each of methylene chloride and ether. After drying, there was 577 g. of diiminosuccinonitrile (96% yield).

The NMR, UV, and IR spectra of diiminosuccinonitrile compare favorably with those of two other known imines whose structure is quite similar, namely α-iminotrichloropropionitrile and α-iminotrifluoropropionitrile.

UV spectrum $\lambda_{max.}^{CH_3CN}$: 292 m$\mu$ ($\epsilon$ 280)

Dipole moment in dioxane: 1.59 Debye

Sublimation of some of the diiminosuccinonitrile prepared as above gave a product melting at 166–167° and having the following analysis (cf. Example 1). Found (percent): C, 45.73; H, 2.13; N, 52.63, 52.75.

As noted above, diiminosuccinonitrile can be employed as an intermediate to diaminomaleonitrile (HCN tetramer) or as a propellant. These utilities of the compound are illustrated in Examples A and B which follow.

EXAMPLE A

Conversion of diiminosuccinonitrile to diaminomaleonitrile (1) From hydrogen cyanide and cyanogen without isolation of intermediates: A solution of 1 ml. of liquid cyanogen, 10 ml. of liquid hydrogen cyanide, and 50 ml. of acetonitrile was cooled to −40° and 0.1 g. of potassium cyanide was added. The mixture was warmed to 0°. At this point, the temperature flashed to 10° and cooling was necessary to hold it and bring it back to −10°. The mixture was stirred at 0° for 2 hours and was evaporated to dryness; the residue was washed with water. The precipitate was mainly a mixture of diaminomaleonitrile and diiminosuccinonitrile. The diaminomaleonitrile, 0.82 g., was extracted from the residue with hot isobutanol.

(2) From diiminosuccinonitrile and hydrogen cyanide: To a suspension of 5.00 g. of diiminosuccinonitrile in 50 ml. of water at 0° was added 14 g. of liquid hydrogen cyanide, then 3.25 g. of potassium cyanide. The mixture was stirred 2 hours and 6.28 g. of black solid was isolated by filtration. Diaminomaleonitrile, 1.56 g., was isolated by extraction of the solid with hot isobutanol.

EXAMPLE B

Diiminosuccinonitrile as a component of a solid propellant

An intimate mixture of 1.0 g. of diiminosuccinonitrile and 1.0 g. of sodium nitrate was packed into a 70 by 5 mm. paper tube sealed at one end. The open end of the tube was ignited by a gas burner. The tube was propelled forward by the reaction of this solid fuel mixture, demonstrating the utility of diiminosuccinonitrile as an ingredient in a propellant.

Since obvious modifications and equivalents in the invention will be evident to those skilled in the chemical arts, I propose to be bound solely by the appended claims.

The embodiments of the invention in which an exclusive property or privilege is claimed are defined as follows:

1. Diiminosuccinonitrile.
2. The process of preparing the compound of claim 1 which comprises reacting
   cyanogen and hydrogen cyanide at a temperature in the range −80° to 10° C., and
   in the presence of a catalytic amount of a basic catalyst.
3. The process of claim 2 in which the temperature is in the range −15° to 0° C.
4. The process of claim 2 accomplished in liquid phase.
5. The process of claim 2 in which the basic catalyst is potassium cyanide.
6. The process of claim 2 carried out in the presence of an organic liquid free of Zerewitinoff-active hydrogen and inert to cyanogen and hydrogen cyanide.
7. The process of claim 6 in which the organic liquid is acetonitrile.
8. The process of claim 2 in which there is prepared, additionally, diaminomaleonitrile.
9. The process of claim 8 including the additional step of separating diaminomaleonitrile.
10. The process of preparing diaminomaleonitrile which comprises reacting
    cyanogen and hydrogen cyanide at a temperature in the range 0–200° C., and
    in the presence of a catalytic amount of a basic catalyst.
11. The process of preparing diaminomaleonitrile which comprises reacting
    the compound of claim 1 and hydrogen cyanide at a temperature in the range 0–200° C., and
    in the presence of a catalytic amount of a basic catalyst.

References Cited

UNITED STATES PATENTS 2,499,441   3/1950   Woodward _____ 260—465.5
2,842,584   7/1958   Christmann _____ 260—465.8

LELAND A. SEBASTIAN, Primary Examiner

U.S. Cl. X.R.

149—61